Sept. 21, 1948.  A. B. BELL  2,449,965
ASH RECEPTACLE FOR ARMRESTS OF VEHICLE SEATS
Filed Nov. 2, 1946

Inventor
Alfred B. Bell
by Wright, Brown,
Quinby & May
Attys

Patented Sept. 21, 1948

2,449,965

UNITED STATES PATENT OFFICE 2,449,965

ASH RECEPTACLE FOR ARMRESTS OF VEHICLE SEATS

Alfred B. Bell, Philadelphia, Pa., assignor to Heywood-Wakefield Company, Gardner, Mass., a corporation of Massachusetts Application November 2, 1946, Serial No. 707,498

4 Claims. (Cl. 155—188)

This invention comprises an improved ash receptacle of the type which is built into the arm rest structure of a vehicle seat such as are installed in railway cars, buses, and the like. It is an object of the invention to supply an ash receptacle in the form of a box which is shaped to fit within the hollow arm rest and which has a front wall normally flush with the front wall of the arm rest structure and which may be swung out to an exposed position where it is adapted to receive cigar ashes and the like. Provision is made for permitting the box to be swung still further out so as to be sufficiently inverted to permit the contents thereof to be discharged by gravity. Thus the occupant of the seat can rock the box from its stowed position within the arm rest to a position of use wherein its top is exposed to receive cigar ashes and the like. When the car is cleaned, the ashes may be removed from the box by swinging the same out beyond its normal position of use so as to discharge the contents thereof.

As an optional and desirable feature the box as a whole may be provided with a pair of hinged flaps of concave or angular form that with the sides of the box form the bottom of an open shallow auxiliary receptacle. The two flaps may be pushed inwardly to allow ashes and the like to fall therefrom into the lower portion of the box.

For a more complete understanding of the invention, reference may be had to the following description of an embodiment thereof and to the drawings, of which:

Figure 1:
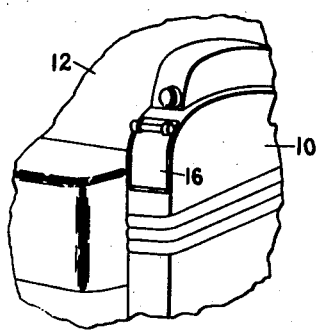
Figure 1 is a fragmentary perspective view of a vehicle seat with an embodiment of the invention built into an arm rest.
Figure 2:
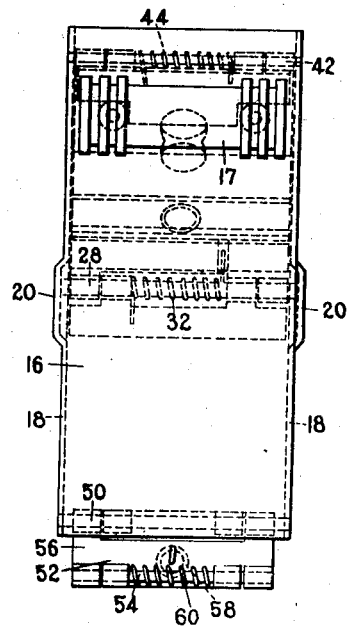
Figure 2 is an elevational front view of the box shown in Figure 1.
Figure 3:
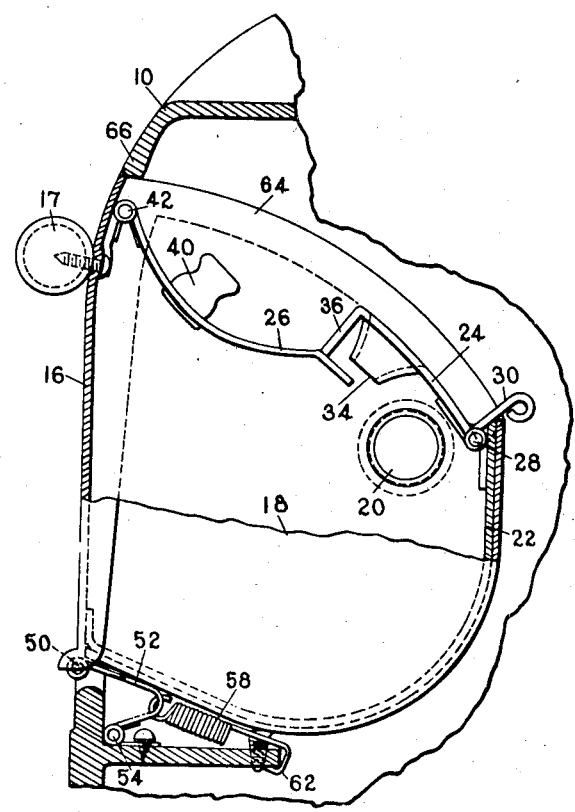
Figure 3 is a sectional view of a portion of the arm rest structure shown in Figure 1, together with the box mounted therein.

A box embodying the invention may be mounted within the arm rest 10 of a vehicle seat 12 so as to be substantially flush with the front wall of the arm rest. The box may conveniently be made of sheet metal or any other suitable material, preferably fireproof. As shown in Figures 2 and 3, the box has a front wall 16 to which is attached a suitable handle member 17. Extending toward the rear from the front wall 16 are side walls 18 which are substantially parallel and from which may project bosses 20 for frictional engagement with the side walls of the arm rest structure so as to prevent too easy movement of the box within the arm rest. A rear wall 22 is joined to the side walls 18, this rear wall being curved forward to meet the lower portion of the front wall 16 and to serve as the bottom for the box. A closure for the box is provided in the form of two hinged flaps 24 and 26. The flap 24 is hinged on a pin 28 to the back wall 22. The rear portion of the flap 24 extends upward at right angles thereto so as to form a fin 30. This fin engages the upper edge of the rear wall 22 and thus prevents upward and outward rocking movement of the flap 24 beyond the normal position indicated in Figure 3. A suitable spring 32 on the pin 28 is arranged to urge the flap 24 outward. This flap is thus maintained yieldingly in the position shown in Figure 3 unless pressed down to rock inward against the pressure of the spring 32. The flap 24 is preferably made with a funnel-like portion 34 which projects a short distance inward and is open at its lower end. This member is of suitable size and shape to facilitate the extinguishing of cigarettes and the like, the lighted ends of which can be wedged into the crater. The forward end of the flap 24 is the free end and is bent down as at 36 to form a flange.

The rear end portion of the flap 26 is free and bears against the extremity of the flange 36 forming therewith and with the side walls 18 a shallow open receptacle in the top of the box for the reception of the cigar ashes and the like. The flap 26 is dished or concaved so as to provide extra capacity for the open ash receptacle. A finger knob 40 is secured to the flap 26 to facilitate the manipulation thereof. The flap 26 is hinged as at 42 to the front wall 16 of the receptacle near its upper edge and a spring 44 is arranged on the hinged pin 42 in such a way as to urge the flap 26 to rock upward and outward. The flap 26 is thus yieldingly maintained in its normal position with its free end pressing upward against the flange 36. By pressing the flap 26 to rock it downward, the contents of the receptacle resting on the flap 26 can be discharged into the box below.

The box as a whole is hinged at the lower end of its front wall to the arm rest structure by a double hinge having a hinge pin 50, one leaf of the hinge being secured to the box. A second leaf 52 extends toward the rear and is bent to extend downward and forward to a second hinge pin 54 mounted on the frame of the arm rest. Through suitable holes in the leaf 52 at the bend thereof is hooked an end of a tension spring 58. The rear end of the spring 58 is attached to the arm rest frame as at 62. The spring 58 thus maintains the hinge pin 50 yieldingly in the position shown in Figure 3 so that when the box is rocked forward, it rocks about the pin 50 as an axis. The spring 58 may be assisted by a spring 60 coiled about the hinge pin 54. The upper edges of the side walls 18 are arcuate as at 64, the center of curvature of these arcs being the axis of the hinge pin 50 so that when the box swings forward and outward to its exposed position for the reception of cigar ashes and the like, the upper edges 64 remain in engagement with the portion of the arm rest wall which forms a lip 66 immediately above the box. When the box is swung out to its position for use, the extent of such movement is limited by the engagement of the fin 30 against the lip 66 when the box has swung out far enough. When, however, it is desirable to empty the box, it can be pressed downward so as to rock the leaf 52 about its hinge 54, thus lowering the entire box including its hinge 50 so that the fin 30 can clear the lip 66. The box is then free to be swung forward and downward to a substantially inverted position. If then the flap 24 is pushed inward until the flange 36 clears the rear edge of the flap 26, the latter can then spring up and out to permit the discharge of the contents of the box therefrom. The flap 26 is then swung into the box, pushing the flap 24 inward until the rear edge of the flap 26 clears the flap 24 whereupon the latter springs back to the position shown in Figure 3. The flap 26 may then be released so that its spring 44 will restore it to the position shown in Figure 3. The box can then be swung back to its stowed position within the arm rest whereupon it is out of the way until it is desired for use again.

Having thus disclosed my invention and described in detail an illustrative embodiment thereof, I claim as new and desire to secure by Letters Patent:

1. An ash receptacle for a hollow arm rest of a vehicle seat or the like, comprising a box within said arm rest having a front wall substantially flush with the front wall of the arm rest and having parallel side walls, a hinge attached to said box at its lower portion to support the box for rocking movement out of said arm rest, means in said arm rest yieldingly supporting said hinge in a normal position, and a stop element on said box normally limiting the extent of outward rocking movement of the box, said box being depressible with its hinge to clear said stop element and permit the box to be rocked outward beyond its ordinary range of rocking movement.

2. An ash receptacle for a hollow arm rest of a vehicle seat or the like, comprising a box housed in said arm rest and pivotally mounted for rocking movement outward from its housed position, closure means in said box below the top thereof to form a shallow open receptacle to receive cigar ashes and the like when the box is rocked outward from its housed position, said closure means comprising two flaps hinged to the box and rockable inward from a normal position to discharge matter thereon into the lower portion of the box, and spring means tending to rock said flaps outward, one of said flaps having its free end overlapping the free end of the other flap and having an upstanding fin arranged to engage a wall portion of the box to prevent upward rocking movement of said one flap beyond its normal position, said arm rest having a wall portion directly above the front of the box forming a lip behind which said fin engages when the box is rocked outward to limit the extent of such outward rocking movement, said pivotal connection between the box and arm rest being yielding to permit the box to be pushed down to clear the fin from the lip so that the box can be swung further outward.

3. An ash receptacle for a hollow arm rest of a vehicle seat or the like, comprising a box having a front wall substantially flush with the front wall of the arm rest structure and having parallel side walls, a double-jointed hinge connecting said receptacle to said arm rest structure, said hinge having two hinge pins, a leaf from one said pin being secured to the box, a leaf from the other pin being secured to the arm rest structure, and a third leaf extending between said pins, whereby said third leaf is rockable about the second said pin for lateral movement of the first said pin, spring means tending to restrain said third leaf from rocking movement, whereby the box is normally rockable about the first said pin as an axis from a stowed position within the arm rest structure to an exposed position for use, and a stop element on said box arranged to engage a portion of the arm rest structure to limit the extent of outward swing of the box about the axis of the first said pin, said stop element being releasable by rocking movement of said third leaf to shift the axis of the first said pin and permit the box to be swung further out from its stowed position.

4. In a wall having a hollow, a built-in ash receptacle comprising a box having a front wall substantially flush with the adjacent wall surface, hinge means rockably connecting the box to the wall whereby the box may be rocked outward from its position in the hollow to an exposed position for use, said box having closure means therein below the top thereof to form an open receptacle for cigar ashes and the like, said closure means comprising two flaps with adjacent margins overlapping, said flaps being hinged to said box at their mutually remote edges, spring means associated with each said flap tending to rock it outward from the box, stop means on one of said flaps having the double function of preventing outward rocking movement thereof beyond its normal position overlapping a marginal portion of the other flap, and of limiting the outward rocking movement of the box as a whole to its exposed position of use.

ALFRED B. BELL.

REFERENCES CITED

The following references are of record in the file of this patent:

UNITED STATES PATENTS

| Number | Name | Date |
|---|---|---|
| 812,343 | Horner | Feb. 13, 1906 |
| 1,573,870 | Sanford | Feb. 23, 1926 |
| 2,215,626 | Visser | Sept. 24, 1940 |
| 2,294,173 | Gillisse | Aug. 25, 1942 |
| 2,398,936 | Hendricks | Apr. 23, 1946 |